United States Patent [19]
Schlicher

[11] Patent Number: 4,594,521
[45] Date of Patent: Jun. 10, 1986

[54] REPEATABLE EXPLOSIVE-DRIVEN PULSE GENERATOR SYSTEM AND METHOD

[76] Inventor: Rex L. Schlicher, 7420 Painted Pony Trail, NW., Albuquerque, N. Mex. 87120

[21] Appl. No.: 671,394

[22] Filed: Nov. 15, 1984

[51] Int. Cl.[4] .................................. H02K 33/00
[52] U.S. Cl. ................................. 310/15; 290/1 R
[58] Field of Search ............... 310/15, 30, 12, 13, 310/14; 290/1

[56] References Cited

U.S. PATENT DOCUMENTS

| | | | |
|---|---|---|---|
| 2,377,425 | 6/1945 | Jackson | 73/167 |
| 2,544,077 | 3/1951 | Gardner | 310/15 |
| 2,870,675 | 1/1959 | Salisbury | 310/14 X |
| 3,257,905 | 6/1966 | Weisman et al. | 310/14 X |
| 3,259,769 | 7/1966 | Stott | 310/1 |
| 3,337,760 | 8/1967 | Allport | 310/13 |
| 3,356,869 | 12/1967 | Hilton et al. | 310/10 |
| 3,478,231 | 11/1969 | Knoepfel et al. | 310/10 |
| 4,370,576 | 1/1983 | Foster, Jr. et al. | 310/10 |

Primary Examiner—Donovan F. Duggan
Attorney, Agent, or Firm—Donald J. Singer; Bobby D. Scearce; John R. Flanagan

[57] ABSTRACT

A repeatable explosive-driven electrical pulse generator system includes an explosive propellant driver in which the chemical charge in a cartridge is exploded by impact of the driver's firing pin by the hammer of an actuator. The chemical energy released by the explosion drives a piston and piston rod within a cylinder of the driver from an initial retracted position to an extended position. Simultaneously, a high coercivity permanent magnet attached to the piston rod and disposed between the poles of a magnetic circuit in a slot of a ferromagnetic core is ejected from the magnetic circuit. Such rapid ejection causes rapid decrease in the flux flow in the magnetic circuit and generation of an electrical pulse in a coil coupled in the magnetic circuit. The restoring action of a reset spring and pneudraulic device compressed by the movement of the permanent magnet returns the magnet and piston rod to their initial positions where they are set for a repetition of the operating cycle of the generator system.

3 Claims, 14 Drawing Figures

120V A.C. POWER

REPEATABLE EXPLOSIVE-DRIVEN PULSE GENERATOR SYSTEM AND METHOD

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to power sources having high power per volume and weight ratio and, more particularly, is concerned with a generator system and method for converting chemical/mechanical input of an explosive propellant-actuated permanent magnet linear generator into a high pulse power electrical output to provide such a power source.

2. Description of the Prior Art

Projected future Air Force missions of transatmospheric vehicles include the interdiction of a potential adversary's spaced-based assets. Such vehicles armed, for instance, with laser weapons or some other directed energy weapon will require power sources for these weapons. Because of well-known constraints imposed by aerospace vehicle design limitations, these power sources must have the highest power per volume and weight ratio technologically possible.

In the realm of conventional, non-nuclear power sources, chemical explosives represent the highest power available per volume and weight. For that reason, explosive propellants are used as the primary power source for launching rockets into space. Conceptually then, an explosive-driven electric pulse generator should be the best device to satisfy these requirements for a power source in space. However, there are many unsolved technologicical problems. This is evidenced by the fact that, in general, contemporary explosive-driven electric pulse generators do not survive a single event and hence are impractical for repetitive or continuous use.

Consequently, a need exists for an explosive-driven generator system which can operate in a repeatable manner to reliably produce a high power electrical pulse output.

SUMMARY OF THE INVENTION

The present invention provides a repeatable explosive-driven pulse generator system and method designed to satisfy the aforementioned needs. To generate an electrical pulse, the generator system almost instantaneously converts chemical energy to mechanical energy to electrical energy. The generator system includes four main components: an explosive actuator; an explosive propellant driver; a permanent magnet linear generator; and a braking and recovery mechanism. The first three of these components accomplish the energy conversion by releasing low explosive chemical energy and coupling this energy to the magnetomotive force of a permanent magnet via the adiabatic expansion of a cylinder/piston arrangement. Such coupling causes rapid ejection of the magnet from a stationary magnetic circuit and thereby generates an electrical pulse. The fourth component captures the remaining kinetic energy of the second and third components to reset the system to its initial condition. The fact that operation of each of these components involves linear motion enhances the overall efficiency of the system and contributes to the simplicity of its configuration. For certain applications where the requirements of portability and simplicity of the operative mechanisms override the requirement of high efficiency, the pulse generator system of the present invention is highly suitable. In addition, for certain applications, this system eliminates the requirement for a pulse-forming electrical network. A further significant advantage of the generator system is that it is repeatable. In other words, the system does not require reconstruction after each event.

Accordingly, the present invention is directed to a repeatable explosive-driven pulse generator system and method, which employ the combined operative steps of: (a) exploding a chemical propellant against a piston reciprocably mounted in a cylinder; (b) driving the piston from its initial position in a first linear direction along the cylinder as a result of the exploding step; (c) ejecting a permanent magnet connected to the piston from its initial position in a magnetic circuit as a result of the driving step; (d) generating an electrical pulse in a coil coupled in the magnetic circuit as a result of the ejecting step; (e) capturing the driving force of the ejecting permanent magnet; and (f) resetting the magnet and piston by moving them in a second opposite linear direction to their initial positions as a result of the driving, ejecting and capturing steps.

More particularly, the generator system is comprised of an explosive actuator, an explosive propellant driver, a permanent magnet linear generator, and a braking and recovery mechanism.

The explosive actuator includes a pair of spaced-apart solenoid devices having respective plungers mounted for parallel reciprocable movement, a hammer disposed between the solenoid devices and mounted for reciprocable movement parallel to the plungers, a transverse extending link interconnecting corresponding ends of the plungers and the hammer, a reset spring connected to the link, and switch means movable between an activated condition causing forward actuating movement of the plungers and hammer which results in extension of the reset spring and a deactivated condition allowing retraction of the reset spring which causes reverse resetting movement of the plungers and hammer.

The explosive propellant driver includes a breech for receiving an explosive cartridge therein, a firing pin coupled on one end of the breech and (upon impact by the hammer of the explosive actuator) engageable with the cartridge for exploding the same, an elongated cylinder connected at one end in communciation with the opposite end of the breech, a piston reciprocably mounted in the cylinder and having one end in communication with the breech, a piston rod extending from an opposite end of the piston through an opposite end of the cylinder and movable on reciprocable movement of the piston between an initial retracted position and an extended position, and means defining exhaust ports adjacent the cylinder opposite end.

The permanent magnet linear generator includes a laminated ferromagnetic iron core having a central slot therethrough defining a pair of magnetic poles of opposite polarity, a high coercivity permanent magnet disposed in the slot of the core for forming a magnetic circuit therewith, and a pair of stator coils disposed about opposing portions of the core. The permanent magnet is interconnected to an end of the piston rod of the driver for movement therewith and relative to the core between an initial position in the central slot of the core where the magnet forms part of the magnetic circuit and an ejected position substantially outside of the core where the magnet is substantially removed from the magnetic circuit, decreasing the flux of the same.

The braking and recovery mechanism includes components disposed in a two-stage arrangement. In a first stage, a reset spring disposed adjacent to the linear generator and coupled with the permanent magnet is the first component of the mechanism to receive and bear the initial part of the drive force of the permanent magnet of the linear generator. In a second stage, a pneudraulic dampening device disposed in tandem with the reset spring is the second component of the mechanism which receives and bears most of the remaining drive force once the reset spring has been substantially compressed and thus reached the end of its force absorbing or capturing effectiveness. Also, the mechanism includes an elongated guide rod interconnecting the end of the permanent magnet and a piston reciprocably mounted within a cylinder of the pneudraulic device. The reset spring encircles the elongated guide rod and is connected to the leading end of the permanent magnet. In addition, a pair of plates are provided in the mechanism, one being mounted in slidable relation on the elongated rod and the other mounted adjacent to the cylinder of the pneudraulic device with the elongated rod slidable relative to the other plate. The reset spring is disposed between the two plates, and a set of safety springs is interposed between the two plates.

To initiate the operating cycle of the pulse generator system, first, the chemical charge in the cartridge is exploded by actuation of the firing pin. The energy released by the explosion drives the piston and piston rod relative to the cylinder from the initial retracted position toward their extended position. Simultaneously, the permanent magnet attached on the end of the piston rod is ejected from the slot in the iron core and compresses, first, the reset spring and, next, the pneudraulic device. The permanent magnet is ejected from the magnetic circuit at right angles to the flux flow in the circuit and causes a rapid decrease in the net flux flowing through the magnetic circuit and the generation of an electrical pulse in the stator coils. Finally, the restoring action of the compressed reset spring returns the permanent magnet and the piston to their initial positions where they are set for a repetition of the operating cycle of the generator system.

DETAILED DESCRIPTION OF THE INVENTION

In General

Figure 1A:
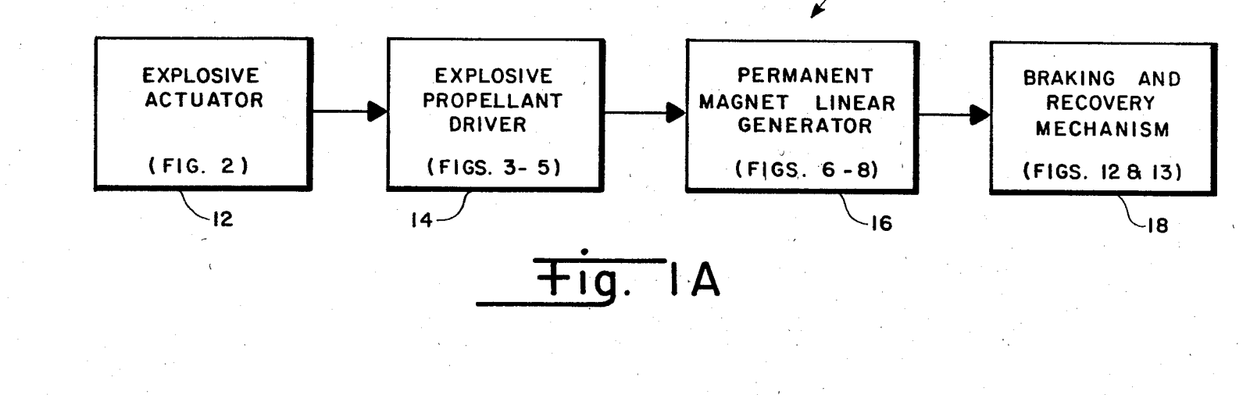
FIG. 1A is a block diagram representation of the repeatable explosive-driven pulse generator system of the present invention.

Referring now to the drawings, and more particularly to FIG. 1A, there is shown a block diagram representation of the repeatable explosive-driven pulse generator system of the present invention, being generally designated 10, with each block containing a reference to the figure or figures (other than FIG. 1B) in which the component represented by the block is depicted in detail. The generator system 10 has four main components: an explosive actuator 12, an explosive propellant driver 14, a permanent magnet linear generator 16, and a braking and recovery system 18.

Figure 1B:
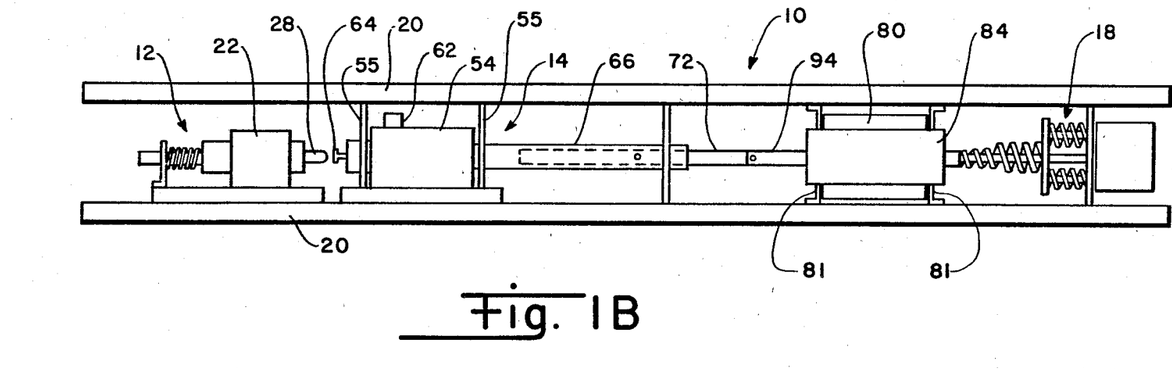
FIG. 1B is a side elevational view of the repeatable explosive- driven pulse generator system of the present invention showing the basic components comprising the system.

As seen in FIG. 1B, the main components of the generator system 10 are mounted in operative relationship to one another between upper and lower support beams 20 for coaction to generate an electrical pulse and return the system to its initial condition so that generation of another pulse can be repeated. Particularly, the explosive actuator 12 impacts the input end of the explosive propellant driver 14 causing the explosion of a propellant and expansive release of chemical energy in an adiabatic reaction therein. The chemical energy is converted into mechanical driving motion at the output end of the driver 14 which rapidly ejects a permanent magnet from a magnetic circuit of the linear generator 16. The ejection and decoupling of the permanent magnet from the stationary magnetic circuit causes generation of an electrical pulse in a coil associated with the circuit of the linear generator 16. Following pulse generation, the braking and recovering system 18 captures the remaining kinetic energy of the driver 14 and linear generator 16 and returns them to their initial conditions. Each of the main components of the generator system 10 will now be described in detail.

Explosive Actuator

Figure 2:
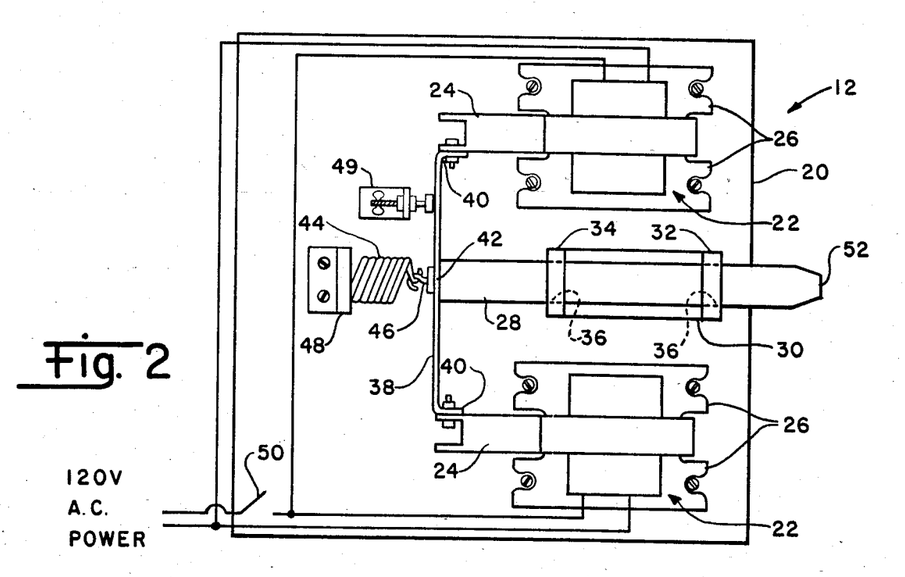
FIG. 2 is an enlarged top plan view of the explosive actuator component for actuating the firing pin of the explosive propellant driver component of the generator system of FIG. 1B.

Turning now to FIG. 2, there is shown an exemplary embodiment of the explosive actuator 12 of the generator system 10. The actuator 12 includes a pair of solenoid devices 22 having respective plungers 24. Each plunger 24 is mounted in its respective device 22 for reciprocable linear movement relative to the device. Each of the devices 22 is mounted on the lower support beam 20 by a pair of brackets 26 such that its respective plunger 24 is aligned parallel to the plunger of the other device. Thus, the plungers 24 are reciprocably movable along linear paths which extend parallel to one another.

Also, the actuator 12 includes a hammer 28 which is disposed between the solenoid devices 22. A generally U-shaped bracket 30 located centrally between the solenoid devices 22 is attached to the support beam 20. The bracket 30 has a pair of front and rear upstanding legs 32, 34 with an opening 36 through the upper end portion of each leg. The openings 36 are aligned with one another so as to receive the elongated hammer 28 and mount the same for reciprocable movement parallel to the plungers 24.

A link 38 of the actuator 12 extends in transverse relation to the linear parallel orientations of the paths of reciprocable movement of the plungers 24 and the hammer 28 and is connected at opposite end tabs 40 with the rear ends of the plungers and at its middle 42 with the rear end of the hammer. The effect of the link 38 is to interconnect the plungers 24 and hammer 28 together so that they will move together as a unit. A single reset spring 44 is connected at one end to a hook 46 attached to the middle 42 of the link 38, but on the side thereof opposite from the rear end of the hammer 28. The other end of the reset spring 44 is anchored to an upright bracket 48 stationarily attached on the lower support beam 20 at a location spaced rearwardly of the transverse link 38. An adjustable stop 49 is disposed on the lower support beam 20 adjacent the reset spring 44 and the link 38 for engagement with the link 38 to preset the initial or reset position of the link 38 and thereby the hammer 28.

For actuating simultaneous movement of the plungers 24 and the hammer 28 therewith, the solenoid devices 22 are electrically connected in parallel with one another and in series to a source of electrical power via a switch 50. By moving the switch 50 to a closed activated condition, the solenoid devices 22 are energized and cause forward movement of the plungers 24 and the hammer 28 to occur. The forward stroke of the plungers 24 and the hammer 28 terminates when the leading end 52 of the hammer 28 engages or impacts an actuating means of the explosive propellant driver 14 to be described hereinafter. Such movement also results in extension of the reset spring 44. Then, by moving the switch 50 to an open deactivated condition, the solenoid devices 22 deenergize, magnetically release the plungers 24 and thereby allow retraction of the reset spring 44. As the spring 44 retracts or recoils, it causes reverse resetting movement of the plungers 24 and the hammer 28 to their initial positions.

Explosive Propellant Driver

Figures 3, 4, 5:
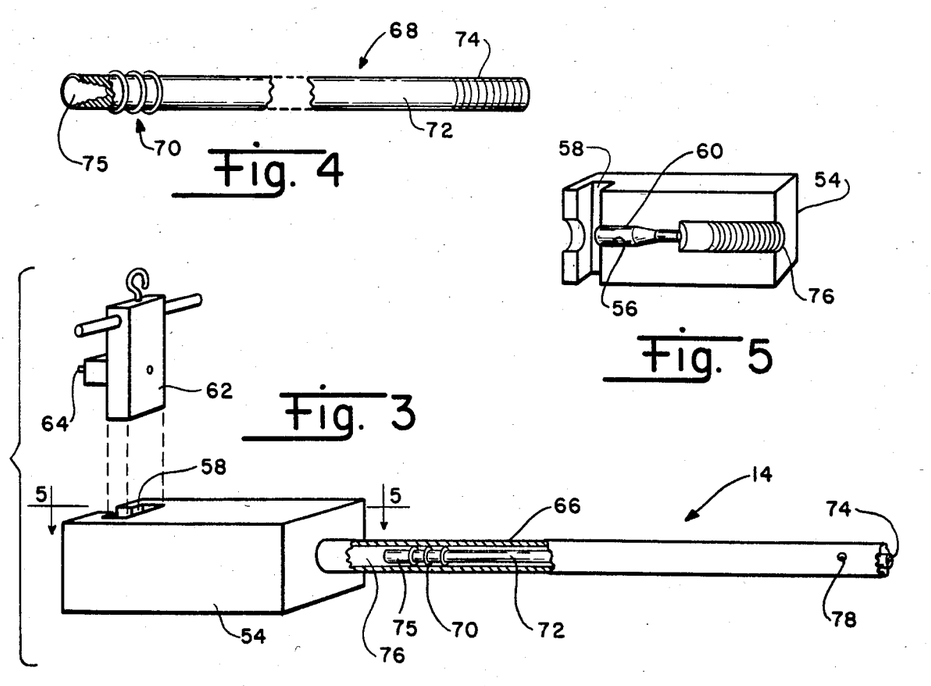
FIG. 3 is an enlarged exploded perspective view of the propellant driver component of the generator system of FIG. 1B.
FIG. 4 is a fragmentary perspective view of the piston and piston rod assembly of the driver component of FIG. 3.
FIG. 5 is a sectional view of the breech of the driver component as taken along line 5—5 of FIG. 3.

Referring now to FIGS. 3 to 5, there is shown the parts forming the explosive propellant driver 14. Basically, the propellant driver 14 includes a breech 54 fixedly mounted between the support beams 20 by a pair of braces 55 and having a horizontally-extending internal cavity 56 and a vertically-extending groove 58 which intersects the cavity 56. The cavity 56 is configured to receive a cartridge 60 containing an explosive propellant. The groove 58 defined adjacent the rear end of the breech 54 receives a breech block 62 which mounts a firing pin 64.

The propellant driver 14 also includes an elongated hollow barrel or cylinder 66 connected at one end to the front end of the breech 54 and in communication with the cavity 56 therein. The cylinder 66 has a central axis which is coaxially aligned with a central axis of the cavity 56 and with the firing pin 64 when the breech block 62 is inserted in the groove 58. A piston/piston rod assembly 68 is reciprocably mounted in the cylinder 66. The piston 70 is located at the end of the assembly near to the breech 54 and the piston rod 72 extends therefrom through an opposite end of the cylinder 66. The terminal end 74 of the piston rod 72 is interconnected to means forming part of the permanent magnet linear generator 16 to be described later on. A cup 75 is formed on the end of the piston rod 72 adjacent the piston 70 which is preferably formed of brass material. The cylinder is preferably made from stainless steel material.

Figure 9:
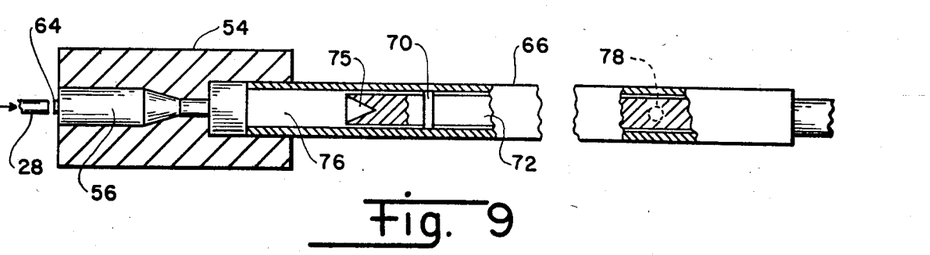
FIGS. 9 to 13 are schematic views of the explosive-driven pulse generator system of FIG. 1B, showing the components of the generator system at three successive sequential stages in the operation of the system.
Figure 10:
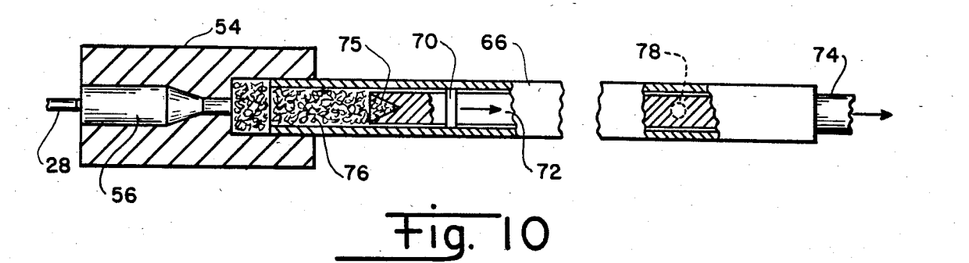

As the piston reciprocably moves within the cylinder 66, the piston rod 72 moves longitudinally of the cylinder between an initial retracted position and an extended position. In the initial retracted position of the piston rod 72, as seen in FIG. 9, the piston 70 is disposed within the cylinder 66 a short distance from the adjacent end of the breech 54 so as to define an expansion chamber 76. As seen in FIG. 10, the chamber 76 will receive the expanding gases from the explosion of the cartridge 60 and communicate the pressure so created to the piston 70. The pressure causes radial expansion of the cup 75 and sealing of the same against the interior cylindrical wall of the cylinder 66.

Therefore, when the firing pin 64 is impacted with sufficient force by the leading end 52 of the hammer 28 of the explosive actuator 12, the firing pin engages the cartridge 60 causing explosion of the same and generation of high pressure in what resembles an adiabatic process. The high pressure created within the chamber 76 by the explosion moves the piston 70 toward the opposite end of the cylinder 66 and the piston rod 72 therewith so as to convert the chemical energy generated by the explosion into mechanical energy. As the piston 70 passes a pair of exhaust ports 78 defined in the cylinder 66 near its opposite end, the gases vent, internal pressure rapidly decreases and the driving force of the piston ceases.

Permanent Magnet Linear Generator

Figure 6:
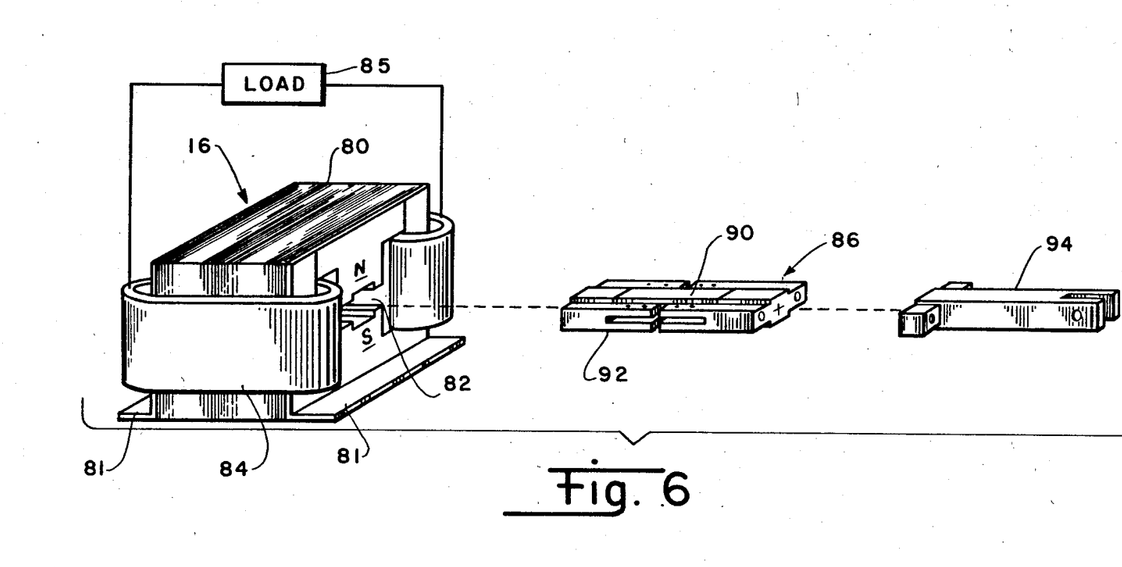
FIG. 6 is an enlarged exploded perspective view of the permanent magnet linear generator component of the generator system of FIG. 1B.
Figure 7:
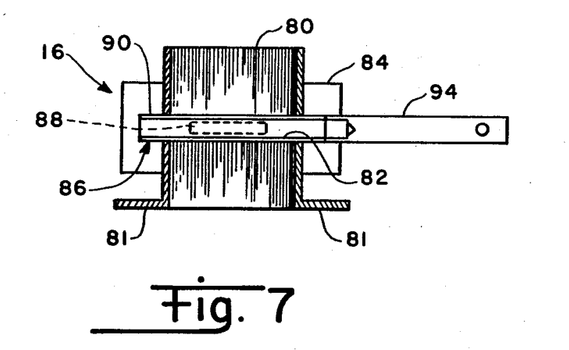
FIG. 7 is a side elevational view of the permanent magnet linear generator component of the generator system of FIG. 1B, shown in assembled form.
Figure 8:
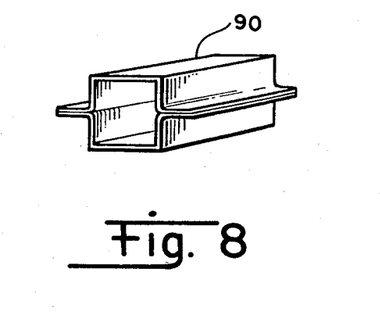
FIG. 8 is a perspective view of a permanent magnet container in the permanent magnet assembly of the linear generator component of FIG. 6.

Continuing on to FIGS. 6 to 8, there is shown the permanent magnet linear generator 16 of the generator system 10, being illustrated in exploded form in FIG. 6 and in assembled form in FIG. 7. The linear generator 16 includes a laminated ferromagnetic iron core 80 fixed on the support base 20 (FIG. 1B) by a pair of spaced brackets 81 and having a central horizontally-extending slot 82 formed therethrough which defines a pair of magnetic poles N and S of opposite polarity. The generator 16 also includes a pair of stator coils 84 disposed about opposing portions of the core 80 and electrically connected to some electrical load 85.

The linear generator 18 further includes a magnet assembly 86 slidably movable through the core 80 and interconnected to the terminal end 74 (FIG. 12) of the piston rod 72 of the propellant driver 14. The assembly 86 is formed of a permanent magnet 88, a container 90 for the permanent magnet 88, a frame 92 for mounting the container 90 with the permanent magnet 88 therein and a plunger 94 for interconnecting the frame 92 with the terminal end 74 of the piston rod 72.

Figure 11:
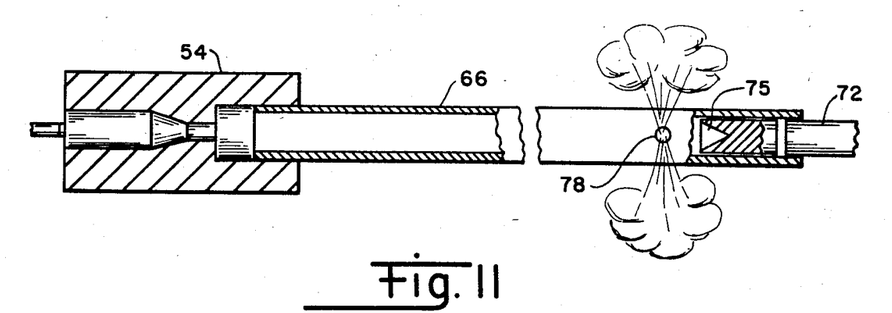

As the piston rod 72 reciprocably moves between retracted and extended positions, as depicted respectively in FIGS. 9 and 11, the permanent magnet 88 moves between an initial position (FIG. 12) in which it is centered in the slot 82 of the core 80 and an ejected position (FIG. 13) where the magnet 88 is substantially outside of the core. When the magnet 88 is disposed in its initial position within the core 80, it forms a high flux magnetic circuit with the iron core 80. However, when the magnet 88 is rapidly ejected from the slot 82 to a position removed from the circuit, the magnet flux decreases sharply and generates an electrical pulse in the stator coils 84.

Braking and Recovery Mechanism

Figure 12:
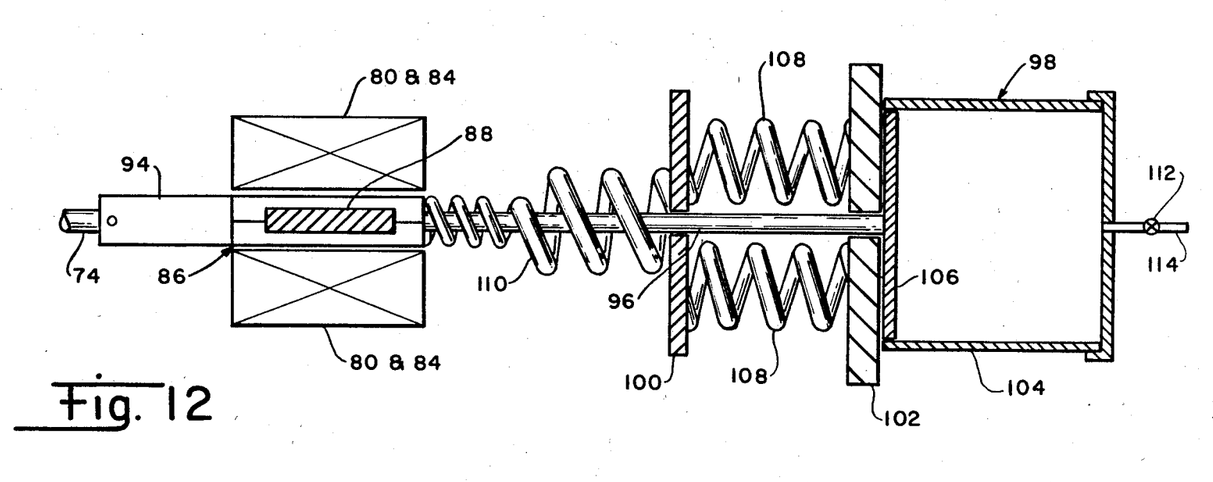
Figure 13:
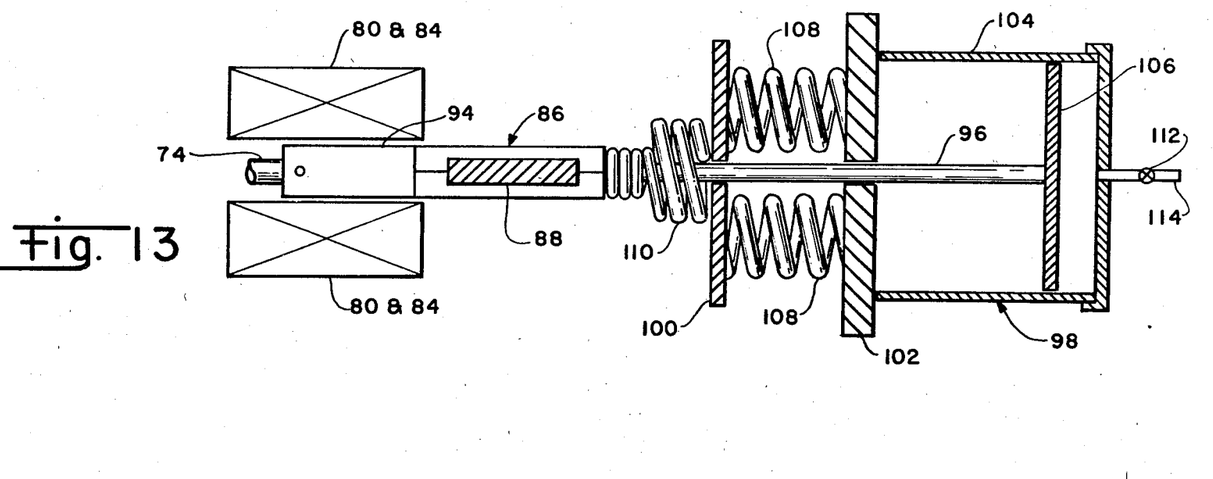

Referring now to FIGS. 12 and 13, the braking and recovery mechanism 18 includes an elongated guide rod 96 which interconnects the leading end of the magnet assembly 86 with a pneudraulic device 98. More particularly, a pair of plates 100,102 are provided in the mechanism 18, one being mounted in slidable relation on the elongated guide rod 96 and the other 102 mounted adjacent to a cylinder 104 of the device 98 with the guide rod 96 slidable relative to it. A piston 106 reciprocally mounted within the cylinder 104 is connected to the leading end of the guide rod 96. A set of safety springs 108 is interposed between the two plates 100,102, while a reset spring 110 is interposed between the leading end of the magnet assembly 86 and the one plate 100.

The components of the braking and recovery mechanism 18 operate in two stages. As the permanent magnet 88 ejects from the central slot 82 of the core 80, in a first stage the reset spring 110 disposed about the guide rod 96 adjacent the core of the linear generator 16 receives and bears the initial part of the drive force and is thereby compressed. In the second stage, the dampening device 98 disposed in tandem with the reset spring 110 receives and bears most of the remaining drive force once the reset spring 110 has been substantially compressed. A valve 112 is interposed in an air line 114 connected to the cylinder 104 for adjusting the rate of air flow from the cylinder and thereby the dampening pressure within the cylinder.

The safety springs 108 serve a backup function should a worst case situation arise. Such a case would occur where no load was connected to the generator 16. Preferably, the reset spring 110 and the pneudraulic device 98 together with the safety springs 108 simulate a nonlinear spring which would be adequate to capture the ejection force of the magnet assembly 86 and then reset the generator system 10. In such a way, the inadvertent destruction of the system 10 is avoided.

Operational Sequence of the Generator System

FIGS. 9 to 13 illustrate three successive sequential stages in the operation of the repeatable explosive-driven pulse generator system 10.

FIGS. 9 and 12 depict the initial configuration of the system 10 at the start of its operational sequence.

In FIG. 10, the operating cycle of the system is initiated by actuation of the hammer (not shown) and then the firing pin 64 which causes the chemical propellant to explode in the expansion chamber 76 of the cylinder 66.

As seen in FIG. 11, the energy released by the explosion drives the piston 70 and piston rod 72 relative to the cylinder 66 from the initial retracted position of FIGS. 9 and 10 to the illustrated extended position. Simultaneously, the permanent magnet 88 in magnet assembly 86 which is interconnected to the end of the piston rod 72 is ejected from the slot 82 in the laminated core 80 and compresses the reset spring 110. The permanent magnet 88 is ejected from the magnetic circuit at right angles to the flux flow in the circuit and thus causes a rapid decrease in the net flux flowing through the circuit, resulting in the generation of an electrical pulse in the stator coils 84.

Finally, the restoring action of the compressed reset spring 110 returns the permanent magnet 88 and the piston rod 72 from their respective extended positions of FIGS. 11 and 13 to their initial positions, as seen in FIGS. 9 and 12, where they are set for a repetition of the operating cycle of the generator system 10.

It should be understood that devices other than those disclosed herein may be used in the generator system 10 to actuate the firing pin and to restore the magnet and piston rod to their initial position. The explosive actuator 12 and the recovery mechanism 18 are merely illustrative of types of devices that can be used.

It is thought that the repeatable explosive-driven pulse generator system and method of the present invention and many of the attendant advantages thereof will be understood from the foregoing description and it will be apparent that various changes may be made in the form, construction and arrangement of the parts and in the sequence of the steps thereof without departing from the spirit and scope of the invention or sacrificing all of its material advantages, the form hereinbefore described being merely a preferred or exemplary embodiment thereof.

Having described the invention, what is claimed is:

1. A repeatable explosive-driven electrical pulse generator system, comprising:
   a. an explosive propellant driver having input and output ends and disposed for receiving an impact at said input end for causing explosion of a propellant and expansive release of chemical energy, said driver operable for converting said released chemical energy into mechanical driving motion at said output end;
   b. a permanent magnet linear generator having means defining a magnetic circuit, a permanent magnet means coupled to said output end of said driver and supported for movement along a generally linear path with respect to said magnetic circuit and means coupled to said magnetic circuit for generating an electrical pulse in response to movement of said permanent magnet means;
   c. a braking and recovery mechanism for capturing residue kinetic energy of said moving permanent magnet means and returning said permanent magnet means to its initial position; and
   d. an explosive actuator disposed adjacent said driver and being operable for impacting said input end of said driver, said explosive actuator including:
      a pair of spaced-apart solenoid devices having respective plungers mounted for parallel reciprocable movement;
      a hammer disposed between said solenoid devices and mounted for reciprocable movement parallel to said plungers;
      a transverse extending link interconnecting corresponding one ends of said plungers and said hammer;
      reset means connected to said link and being resiliently extendable and retractable; and
      switch means movable between an activated condition for energizing said solenoid devices to cause forward actuating movement of said plungers and said hammer and therewith extension of said reset means, and a deactivated condition for deenergizing said solenoid devices to allow retraction of said reset means and thereby reverse resetting movement of said plungers and hammer.

2. A repeatable explosive-driven electrical pulse generator system comprising:
 a. an explosive propellant driver having input and output ends and disposed for receiving an impact at said input end for causing explosion of a propellant and expansive release of chemical energy, said driver operable for converting said released chemical energy into mechanical driving motion at said output end and including:
  a breech for receiving an explosive cartridge therein;
  a firing pin coupled on one end of said breech and upon impact engageable with said cartridge for exploding said cartridge;
  an elongated cylinder connected at one end in communication with an opposite end of said breech;
  a piston reciprocably mounted in said cylinder and having one end in communication with said breech;
  a piston rod extending from an opposite end of said piston through an opposite end of said cylinder and movable on reciprocable movement of said piston between an initial retracted position and an extended position; and
  means defining of least one exhaust port adjacent said cylinder opposite end;
 b. a permanent magnet linear generator having means defining:
  a magnetic circuit comprising a ferromagnetic core having a central slot therethrough defining a pair of magnetic poles of opposite polarity;
  a permanent magnet means including a high coercivity permanent magnet disposed in said slot of said core and coupled between said poles in said magnetic circuit, said magnet being coupled to said output end of said driver and supported for movement along a generally linear path with respect to said magnetic circuit and interconnected to said piston rod of said driver for movement therewith and along said linear path relative to said core between an initial position in said core slot when said piston rod is in its initial retracted position and an ejected position substantially outside of said core removed from said magnetic circuit when said piston rod is in its extended position; and
  electrical pulse generating means comprising at least one coil disposed on said core and coupled in said magnetic circuit for generating an electrical pulse in response to movement of said permanent magnet means; and
 c. a braking and recovery mechanism for capturing residue kinetic energy of said moving permanent magnet means and returning said permanent magnet means to its initial position.

3. The electrical pulse generator system as recited in claim 2, wherein said braking and recovery mechanism includes:
 a reset spring disposed adjacent said linear generator and coupled to said permanent magnet;
 a pneudraulic device disposed adjacent said reset spring and coupled thereto; and
 means supporting said reset spring and coupled with said pneudraulic device such that said spring and device are compressible for capturing kinetic energy of said moving permanent magnet and piston rod and extensible for returning them to their initial positions.

* * * * *